(12) United States Patent
Perry

(10) Patent No.: US 11,499,515 B2
(45) Date of Patent: Nov. 15, 2022

(54) FUEL PUMP AND INLET VALVE ASSEMBLY THEREOF

(71) Applicant: DELPHI TECHNOLOGIES IP LIMITED, St. Michael (BB)

(72) Inventor: Robert B. Perry, Leicester, NY (US)

(73) Assignee: DELPHI TECHNOLOGIES IP LIMITED, St. Michael (BB)

( * ) Notice: Subject to any disclaimer, the term of this patent is extended or adjusted under 35 U.S.C. 154(b) by 441 days.

(21) Appl. No.: 16/270,883

(22) Filed: Feb. 8, 2019

(65) Prior Publication Data

US 2020/0256300 A1 Aug. 13, 2020

(51) Int. Cl.

| | |
|---|---|
| *F04B 53/10* | (2006.01) |
| *F04B 43/02* | (2006.01) |
| *F04B 43/04* | (2006.01) |
| *F02M 59/46* | (2006.01) |
| *F02M 59/02* | (2006.01) |
| *F04B 17/05* | (2006.01) |
| *F16K 15/02* | (2006.01) |

(52) U.S. Cl.
CPC .......... *F02M 59/46* (2013.01); *F02M 59/025* (2013.01); *F04B 17/05* (2013.01); *F16K 15/028* (2013.01); *F04B 2201/06* (2013.01)

(58) Field of Classification Search
CPC ...... F02M 59/02; F02M 59/025; F02M 59/46; F02M 59/462; F02M 59/464; F02M 59/466; F02M 59/48; F02M 59/485; F02M 59/34; F02M 59/366; F02M 59/368; F02M 63/0056; F04B 17/05; F04B 2201/06; F04B 2201/0601; F04B 2201/06011; F04B 2201/06012; F04B 2201/0606; F04B 2201/06061; F04B 2201/06062; F04B 1/0452; F16K 15/028
See application file for complete search history.

(56) References Cited

U.S. PATENT DOCUMENTS

| | | | |
|---|---|---|---|
| 7,124,738 B2 | 10/2006 | Usui et al. | |
| 7,401,594 B2 | 7/2008 | Usui et al. | |
| 7,707,996 B2 | 5/2010 | Yamada et al. | |
| 9,828,958 B2 * | 11/2017 | Saito | F02M 55/04 |
| 2006/0239846 A1 | 10/2006 | Oda et al. | |
| 2009/0288639 A1 * | 11/2009 | Usui | F04B 39/125 |
| | | | 123/457 |

(Continued)

*Primary Examiner* — Dominick L Plakkoottam
*Assistant Examiner* — Charles W Nichols
(74) *Attorney, Agent, or Firm* — Joshua M. Haines

(57) ABSTRACT

A fuel pump includes a fuel pump housing with a pumping chamber and an inlet valve bore which extends along an inlet valve bore axis. The inlet valve bore is stepped such that the inlet valve bore includes a shoulder which is traverse to the inlet valve bore axis. A pumping plunger reciprocates within a plunger bore along a plunger bore axis such that an intake stroke of the pumping plunger increases volume of the pumping chamber and a compression stroke of the pumping plunger decreases volume of the pumping chamber. An inlet valve assembly includes a valve seat with a valve seat flow passage extending therethrough, the valve seat abuts the shoulder and is urged toward the shoulder by pressure within the pumping chamber during the compression stroke. The inlet valve assembly also includes a valve member which is moveable between an unseated position and a seated position.

11 Claims, 6 Drawing Sheets

(56) References Cited

U.S. PATENT DOCUMENTS

2014/0190441 A1* 7/2014 Chern ................. F01L 3/22
　　　　　　　　　　　　　　　　　　　　　123/188.8
2017/0248110 A1　8/2017　Hashida et al.

* cited by examiner

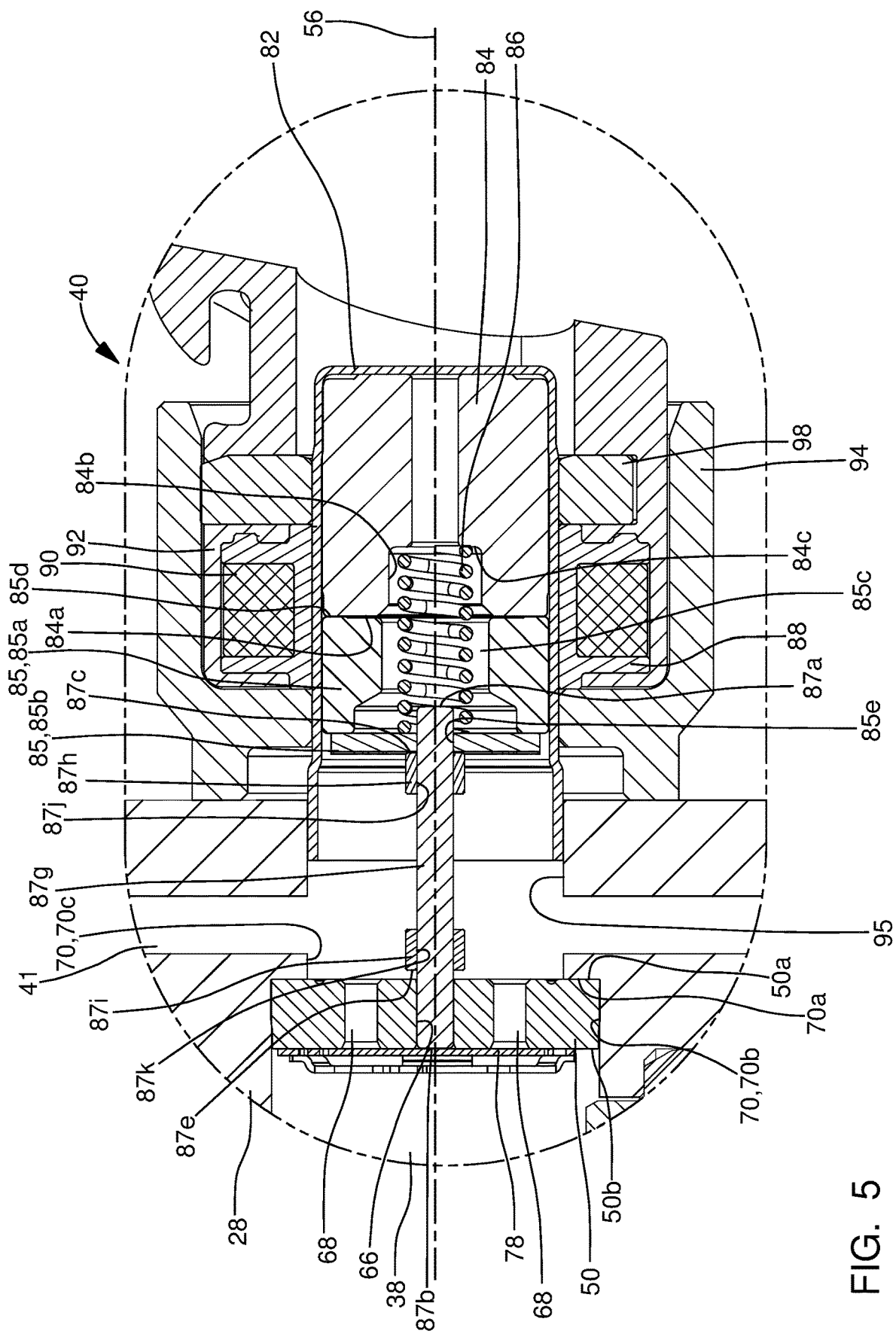

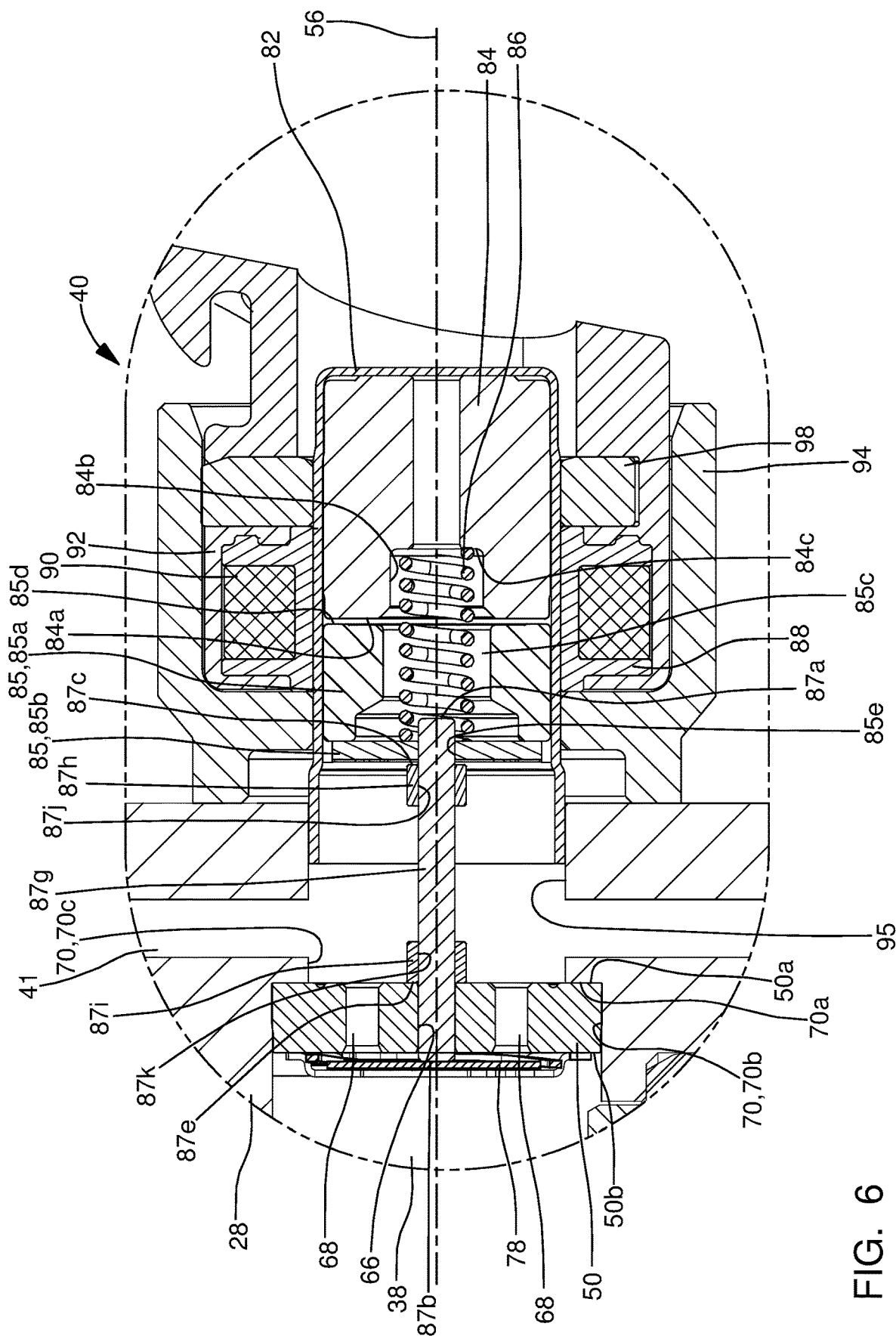

FUEL PUMP AND INLET VALVE ASSEMBLY THEREOF

TECHNICAL FIELD OF INVENTION

The present invention relates a fuel pump which supplies fuel to an internal combustion engine, and more particularly to such a fuel pump which includes an inlet valve assembly.

BACKGROUND OF INVENTION

Fuel systems in modern internal combustion engines fueled by gasoline, particularly for use in the automotive market, employ gasoline direct injection (GDi) where fuel injectors are provided which inject fuel directly into combustion chambers of the internal combustion engine. In such systems employing GDi, fuel from a fuel tank is supplied under relatively low pressure by a low-pressure fuel pump which is typically an electric fuel pump located within the fuel tank. The low-pressure fuel pump supplies the fuel to a high-pressure fuel pump which typically includes a pumping plunger which is reciprocated by a camshaft of the internal combustion engine. Reciprocation of the pumping plunger further pressurizes the fuel in order to be supplied to fuel injectors which inject the fuel directly into the combustion chambers of the internal combustion engine. During operation, the internal combustion is subject to varying demands for output torque. In order to accommodate the varying output torque demands, the mass of fuel delivered by each stroke of the pumping plunger must also be varied. One strategy to vary the delivery of fuel by the high-pressure fuel pump is to use a digital inlet valve which allows a full charge of fuel to enter the pumping chamber during each intake stroke, however, the digital inlet valve may be allowed to remain open during a portion of a compression stroke of the pumping plunger to allow some fuel to spill back toward the source. When the digital inlet valve is closed during the remainder of the compression stroke, the fuel is pressurized and the pressurized fuel is supplied to the fuel injectors. Examples of such an arrangement are disclosed in U.S. Pat. No. 7,401,594 to Usui et al. and in U.S. Pat. No. 7,707,996 to Yamada et al. Prior art inlet valves such as those disclosed by Usui et al. and Yamada et al. suffer from the shortfall of the inlet valve being retained within a housing of the high-pressure fuel pump by a secondary means such as one or more of interference fit, threaded connection, welding, and threaded fasteners. Not only do these secondary means increase cost and complexity, but robustness of the connection may be reduced.

What is needed is a fuel pump and inlet valve which minimizes or eliminates one or more of the shortcomings as set forth above.

SUMMARY OF THE INVENTION

Briefly described, a fuel pump includes a fuel pump housing with a pumping chamber defined therein, the fuel pump housing having an inlet valve bore which is connectable to a source of fuel via a pump housing inlet passage, the inlet valve bore extending along an inlet valve bore axis and being stepped such that the inlet valve bore includes a shoulder which is transverse to the inlet valve bore axis; a pumping plunger which reciprocates within a plunger bore along a plunger bore axis such that an intake stroke of the pumping plunger increases volume of the pumping chamber and a compression stroke of the pumping plunger decreases volume of the pumping chamber; and an inlet valve assembly. The inlet valve assembly includes a valve seat with a valve seat flow passage extending therethrough, the valve seat being located within the inlet valve bore such that the valve seat abuts the shoulder and is urged toward the shoulder by pressure within the pumping chamber during the compression stroke; and a valve member which is moveable between 1) an unseated position which provides fluid communication through the valve seat flow passage and 2) a seated position which prevents fluid communication through the valve seat flow passage. By having the valve seat supported by the shoulder of the fuel pump housing, the high cyclic load resulting from the pressurization of fuel in the pumping chamber is carried directly by the fuel pump housing rather than by secondary means such as interference fit, threaded connections, welding, and threaded fasteners as is currently used in the prior art. In this way, the number of components and processes is reduced, thereby reducing cost and providing a more robust connection.

Further features and advantages of the invention will appear more clearly on a reading of the following detailed description of the preferred embodiment of the invention, which is given by way of non-limiting example only and with reference to the accompanying drawings.

BRIEF DESCRIPTION OF DRAWINGS

This invention will be further described with reference to the accompanying drawings in which:

FIG. 5 is the view of FIG. 4, now showing the inlet valve assembly in a second position; and FIG. 6 is the view of FIGS. 4 and 5, now showing the inlet valve assembly in a transient position when moving from the position of FIG. 5 to the position of FIG. 4.

DETAILED DESCRIPTION OF INVENTION

Figure 1:
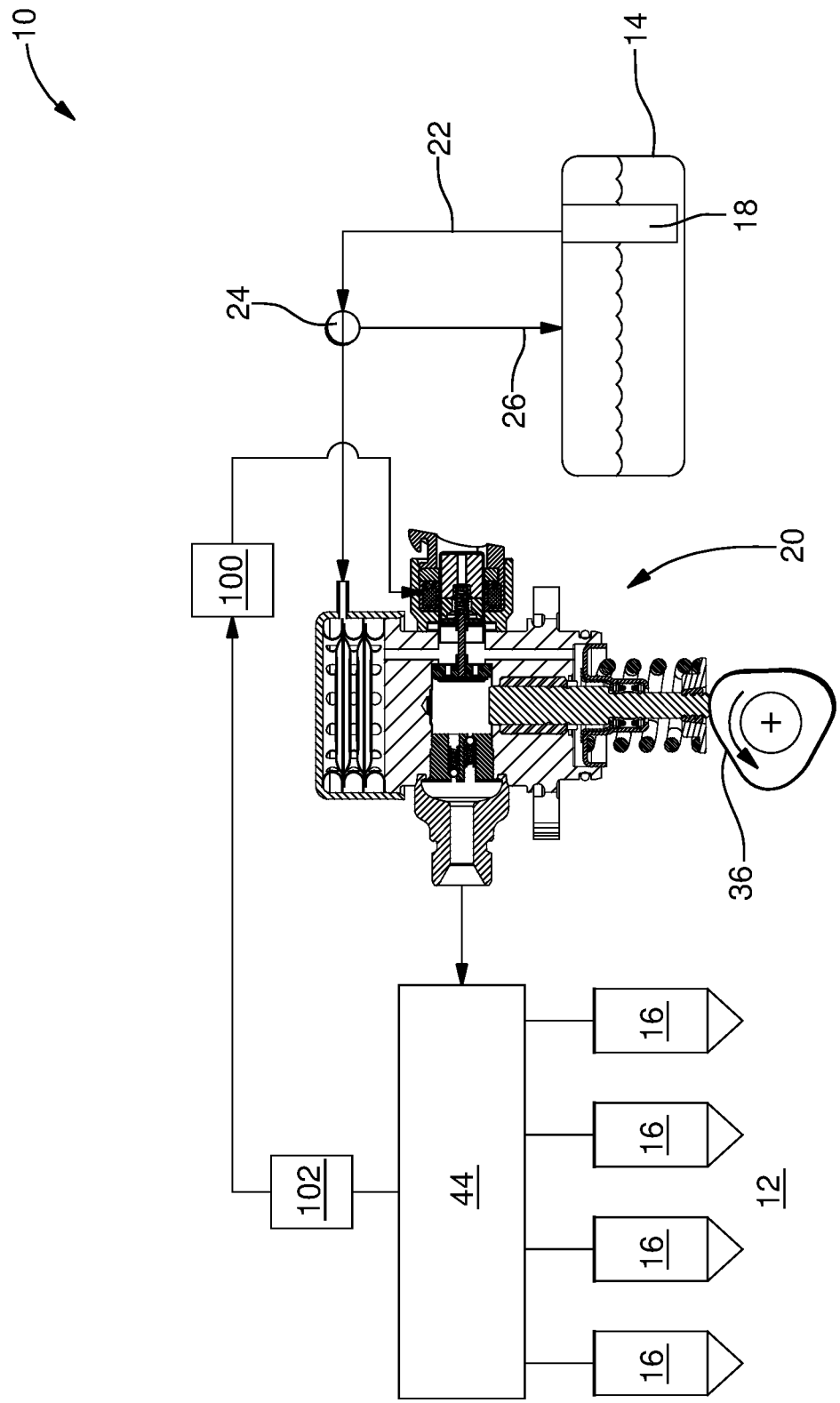
FIG. 1 is a schematic view of a fuel system including a fuel pump in accordance with the present invention.

In accordance with a preferred embodiment of this invention and referring initially to FIG. 1, a fuel system 10 for an internal combustion engine 12 is shown in schematic form. Fuel system 10 generally includes a fuel tank 14 which holds a volume of fuel to be supplied to internal combustion engine 12 for operation thereof; a plurality of fuel injectors 16 which inject fuel directly into respective combustion chambers (not shown) of internal combustion engine 12; a low-pressure fuel pump 18; and a high-pressure fuel pump 20 where the low-pressure fuel pump 18 draws fuel from fuel tank 14 and elevates the pressure of the fuel for delivery to high-pressure fuel pump 20 where the high-pressure fuel pump 20 further elevates the pressure of the fuel for delivery to fuel injectors 16. By way of non-limiting example only, low-pressure fuel pump 18 may elevate the pressure of the fuel to about 500 kPa or less and high-pressure fuel pump 20 may elevate the pressure of the fuel to above about 14 MPa and may be about 35 MPa depending on the operational needs of internal combustion engine 12. While four fuel injectors 16 have been illustrated, it should be understood that a lesser or greater number of fuel injectors 16 may be provided.

As shown, low-pressure fuel pump 18 may be provided within fuel tank 14, however low-pressure fuel pump 18 may alternatively be provided outside of fuel tank 14. Low-pressure fuel pump 18 may be an electric fuel pump as are well known to a practitioner of ordinary skill in the art. A low-pressure fuel supply passage 22 provides fluid communication from low-pressure fuel pump 18 to high-pressure fuel pump 20. A fuel pressure regulator 24 may be provided such that fuel pressure regulator 24 maintains a substantially uniform pressure within low-pressure fuel supply passage 22 by returning a portion of the fuel supplied by low-pressure fuel pump 18 to fuel tank 14 through a fuel return passage 26. While fuel pressure regulator 24 has been illustrated in low-pressure fuel supply passage 22 outside of fuel tank 14, it should be understood that fuel pressure regulator 24 may be located within fuel tank 14 and may be integrated with low-pressure fuel pump 18.

Figure 2:
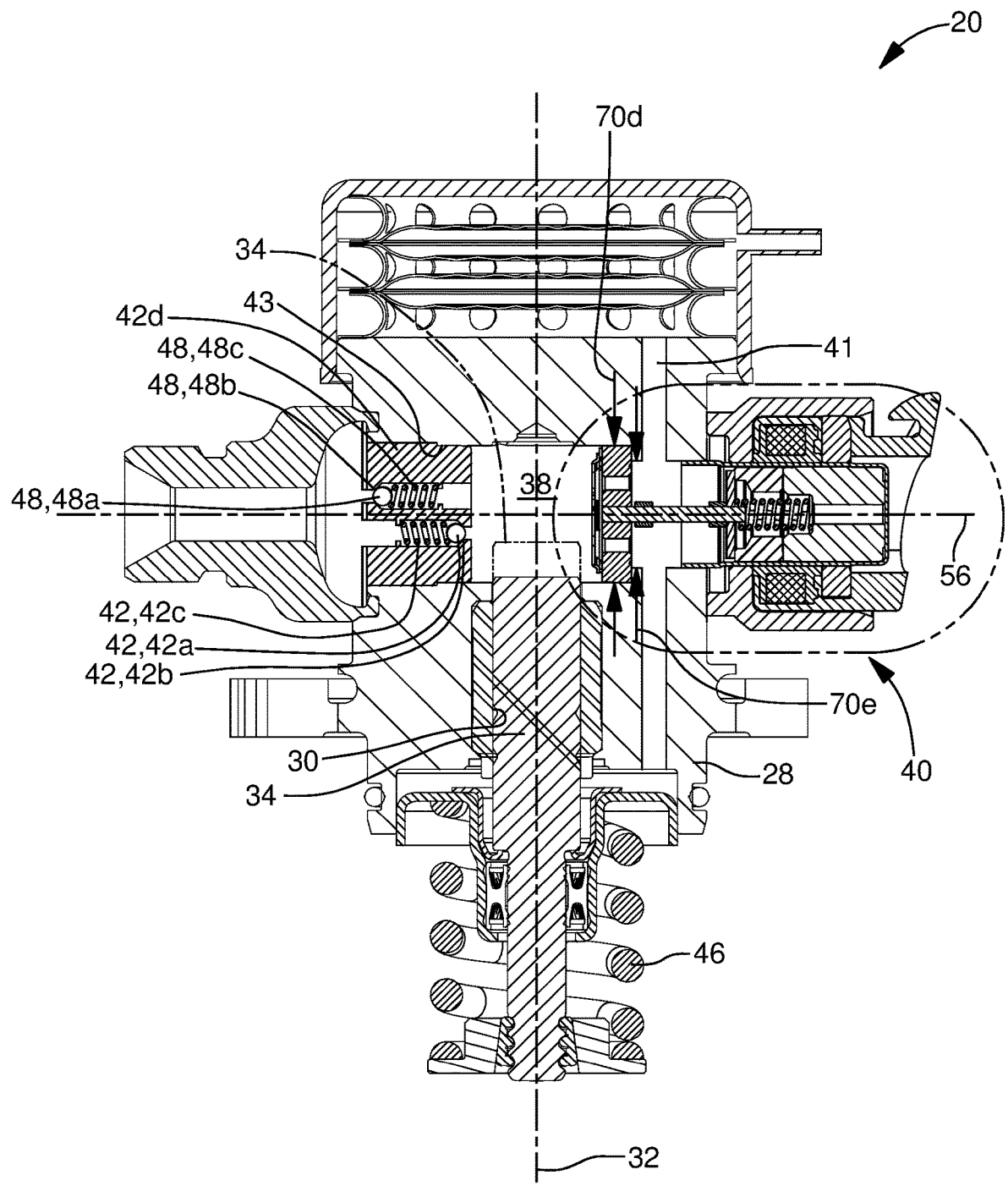
FIG. 2 is a cross-sectional view of the fuel pump of FIG. 1.
Figure 3:
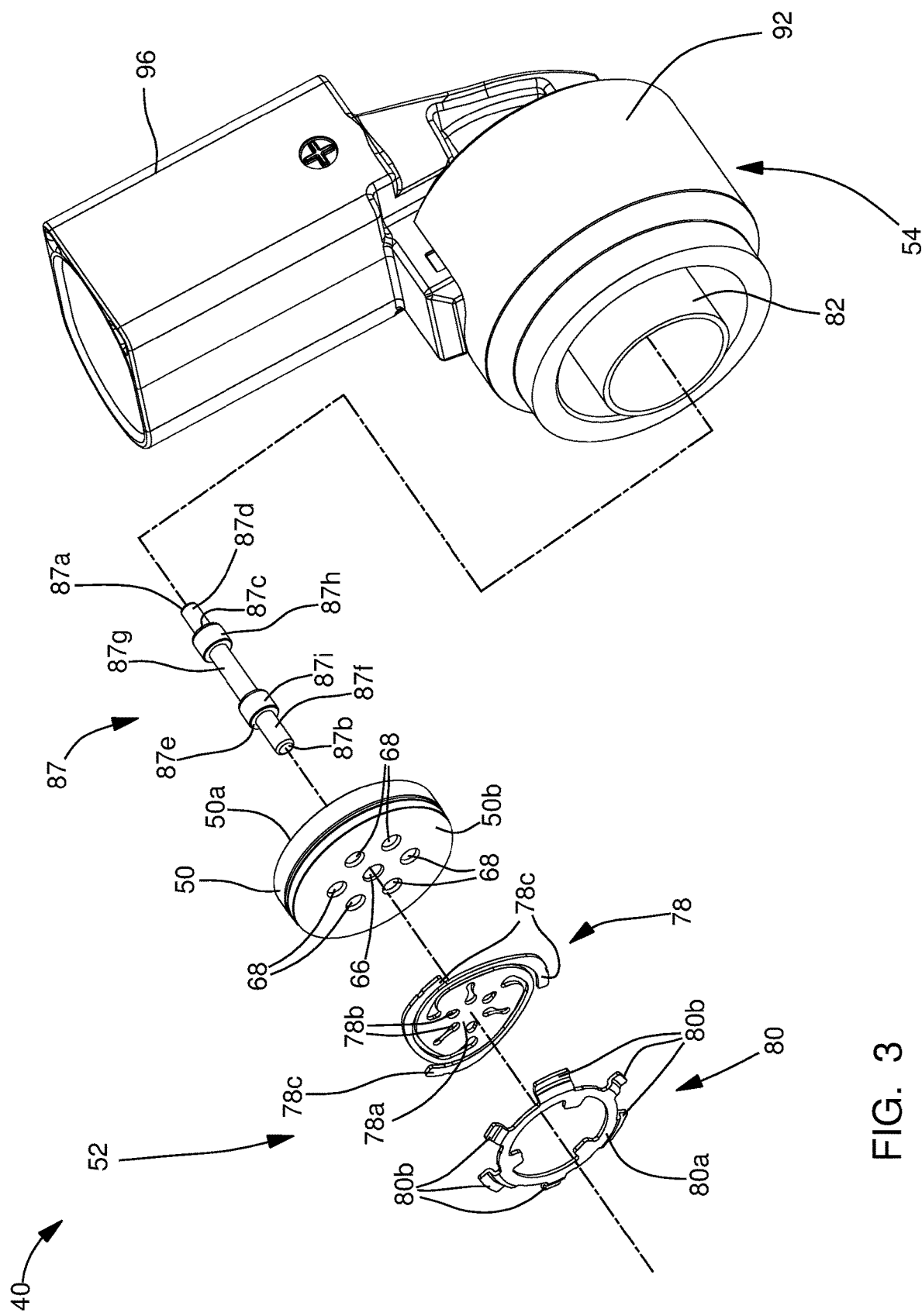
FIG. 3 is an exploded isometric view of an inlet valve assembly of the fuel pump of FIGS. 1 and 2.

Now with additional reference to FIG. 2, high-pressure fuel pump 20 includes a fuel pump housing 28 which includes a plunger bore 30 which extends along, and is centered about, a plunger bore axis 32. As shown, plunger bore 30 may be defined by a combination of an insert and directly by fuel pump housing 28 but may alternatively be formed only, and directly by, fuel pump housing 28. High-pressure fuel pump 20 also includes a pumping plunger 34 which is located within plunger bore 30 and reciprocates within plunger bore 30 along plunger bore axis 32 based on input from a rotating camshaft 36 of internal combustion engine 12 (shown only in FIG. 1). A pumping chamber 38 is defined within fuel pump housing 28, and more specifically, pumping chamber 38 is defined by plunger bore 30 and pumping plunger 34. An inlet valve assembly 40 of high-pressure fuel pump 20 is located within a pump housing inlet passage 41 of fuel pump housing 28 and selectively allows fuel from low-pressure fuel pump 18 to enter pumping chamber 38 while an outlet valve assembly 42 is located within an outlet valve bore 43 of fuel pump housing 28 and selectively allows fuel to be communicated from pumping chamber 38 to fuel injectors 16 via a fuel rail 44 to which each fuel injector 16 is in fluid communication. In operation, reciprocation of pumping plunger 34 causes the volume of pumping chamber 38 to increase during an intake stroke of pumping plunger 34 (downward as oriented in FIG. 2) in which a plunger return spring 46 causes pumping plunger 34 to move downward, and conversely, the volume of pumping chamber 38 decreases during a compression stroke (upward as oriented in FIG. 2) in which camshaft 36 causes pumping plunger 34 to move upward against the force of plunger return spring 46. In this way, fuel is drawn into pumping chamber 38 during the intake stroke, and conversely, fuel is pressurized within pumping chamber 38 by pumping plunger 34 during the compression stroke, depending on the state of operation of inlet valve assembly 40 as will be described in greater detail later, and discharged through outlet valve assembly 42 under pressure to fuel rail 44 and fuel injectors 16. For clarity, pumping plunger 34 is shown in solid lines in FIG. 2 to represent the intake stroke and pumping plunger 34 is shown in phantom lines in FIG. 2 to represent the compression stroke. High-pressure fuel pump 20 also includes a pressure relief valve assembly 48 which is arranged downstream of outlet valve assembly 42 in order to provide a fluid path back to pumping chamber 38 if the pressure downstream of outlet valve assembly 42 reaches a predetermined limit which may pose an unsafe operating condition if left unmitigated.

Outlet valve assembly 42 generally includes an outlet valve member 42a, an outlet valve seat 42b, and an outlet valve spring 42c where outlet valve seat 42b may be formed in an outlet valve body 42d. The outer periphery of outlet valve seat 42b may be stepped as shown and fit within outlet valve bore 43 which is shaped in complementary fashion. Outlet valve body 42d may be fixed within outlet valve bore 43 by way of non-limiting example only, by interference fit, welding, complementary threads, threaded fasteners, combinations of two or more of the foregoing, and the like. Outlet valve member 42a, illustrated by way of non-limiting example only as a ball, is biased toward outlet valve seat 42b by outlet valve spring 42c where outlet valve spring 42c is selected to allow outlet valve member 42a to open when a predetermined pressure differential between pumping chamber 38 and fuel rail 44 is achieved. Outlet valve assembly 42 is oriented such that fuel is allowed to flow out of pumping chamber 38 through outlet valve assembly 42, however, fuel is not allowed to flow into pumping chamber 38 through outlet valve assembly 42.

Pressure relief valve assembly 48 generally includes a pressure relief valve member 48a, a pressure relief valve seat 48b, and a pressure relief valve spring 48c where pressure relief valve seat 48b may be formed in an outlet valve body 42d. Pressure relief valve member 48a, illustrated by way of non-limiting example only as a ball, is biased toward pressure relief valve seat 48b by pressure relief valve spring 48c where pressure relief valve spring 48c is selected to allow pressure relief valve member 48a to open when a predetermined pressure differential between pumping chamber 38 and fuel rail 44 is achieved. Pressure relief valve assembly 48 is oriented such that fuel is allowed to flow into pumping chamber 38 through pressure relief valve assembly 48, however, fuel is not allowed to flow out of pumping chamber 38 through pressure relief valve assembly 48. While pressure relief valve assembly 48 has been illustrated herein as being commonly housed, and integrated with, outlet valve assembly 42, it should be understood that pressure relief valve assembly 48 may be formed entirely separate from outlet valve assembly 42.

Inlet valve assembly 40 will now be described with continued reference to FIGS. 1 and 2 and additionally with particular reference to FIGS. 3-6. Inlet valve assembly 40 includes a valve seat 50, a check valve 52, and a solenoid assembly 54. The various elements of inlet valve assembly 40 will be described in greater detail in the paragraphs that follow.

Valve seat 50 is centered about, and extends along, an inlet valve bore axis 56 such that valve seat 50 extends from a valve seat first end 50a to a valve seat second end 50b where valve seat first end 50a is distal from pumping chamber 38 and valve seat second end 50b is proximal to pumping chamber 38. A valve seat central passage 66 extends through valve seat 50 such that valve seat central passage 66 connects valve seat first end 50a with valve seat second end 50b and such that valve seat central passage 66 is centered about, and extends along, inlet valve bore axis 56. A plurality of valve seat flow passages 68 is provided in valve seat 50 such that each valve seat flow passage 68 extends through valve seat 50 and such that each valve seat flow passage 68 connects valve seat first end 50a with valve seat second end 50b. Each valve seat flow passage 68 is laterally offset from valve seat central passage 66 and extends through valve seat 50 in a direction parallel to inlet valve bore axis 56.

Valve seat 50 is located within an inlet valve bore 70 of fuel pump housing 28 such that inlet valve bore 70 is located between pump housing inlet passage 41 and pumping chamber 38 and such that inlet valve bore 70 extends along, and is centered about inlet valve bore axis 56. Inlet valve bore 70 is stepped such that inlet valve bore 70 includes a shoulder 70a which is transverse to inlet valve bore axis 56. Shoulder 70a faces toward pumping chamber 38. Inlet valve bore 70 includes an inlet valve bore first portion 70b which is proximal to pumping chamber 38 and also includes an inlet valve bore second portion 70c which is distal from pumping chamber 38. Inlet valve bore first portion 70b has a first diameter 70d while inlet valve second portion has a second diameter 70e which is less than first diameter 70d, and in this way, the difference between first diameter 70d and second diameter 70e forms shoulder 70a such that shoulder 70a joins inlet valve bore first portion 70b and inlet valve bore second portion 70c. Valve seat 50, and more particularly valve seat first end 50a, abuts shoulder 70a such that valve seat 50, due to the orientation of shoulder 70a being toward pumping chamber 38, is urged toward shoulder 70a when pressure is generated within pumping chamber 38. Valve seat 50 is fixed within inlet valve bore first portion 70b by interference fit which also provides sealing to prevent fuel from passing between the interface between the outer periphery of valve seat 50 and the inner periphery of inlet valve bore first portion 70b. Consequently, while valve seat 50 may be fixed within inlet valve bore 70, by way of non-limiting example only, by an interference fit, the interference fit is not relied upon to resist the forces generated during the pumping stroke. Instead, shoulder 70a, which is formed by the geometry of fuel pump housing 20, provides the support necessary to hold the axial position of valve seat 50 and resist the pressure generated within pumping chamber 38, unlike the prior art which relies on one or more of interference fit, threaded connections, threaded fasteners, and welding to provide retention and resist the pressure generated within the pumping chamber.

Due to the stepped nature of inlet valve bore 70 with shoulder 70a facing toward pumping chamber 38, valve seat 50 must be installed from the direction of pumping chamber 38. In order to allow installation of valve seat 50 from the direction of pumping chamber 38, outlet valve bore 43 is sized to allow passage of valve seat 50 therethrough. In other words, the smallest portion of outlet valve bore 43 is greater than or equal to the largest portion of valve seat 50. As illustrated in the figures, outlet valve bore 43 may preferably be centered about inlet valve bore axis 56 such that outlet valve bore 43 extends from pumping chamber 38 in a diametrically opposed relationship to inlet valve bore 70. In this way, prior to assembly of outlet valve assembly 42 into outlet valve bore 43, valve seat 50 can be inserted through outlet valve bore 43 and pressed into inlet valve bore 70.

Check valve 52 includes a valve member 78 and a travel limiter 80. Check valve 52 is arranged at valve seat second end 50b such that valve member 78 is moved between a seated position which blocks valve seat flow passages 68 (shown in FIG. 5) and an open position which unblocks valve seat flow passages 68 (shown in FIGS. 4 and 6) as will be described in greater detail later. Valve member 78 includes a valve member central portion 78a which is a flat plate with valve member passages 78b extending therethrough where it is noted that only select valve member passages 78b have been labeled in FIG. 3 for clarity. Valve member passages 78b are arranged through valve member central portion 78a such that valve member passages 78b are not axially aligned with valve seat flow passages 68. A plurality of valve member legs 78c extend from valve member central portion 78a such that valve member legs 78c are resilient and compliant. Free ends of valve member legs 78c are fixed to valve seat second end 50b, for example, by welding. Consequently, when the pressure differential between pump housing inlet passage 41 and pumping chamber 38 is sufficiently high, valve member central portion 78a is allowed to unseat from valve seat second end 50b due to elastic deformation of valve member legs 78c, thereby opening valve seat flow passages 68. Travel limiter 80 includes a travel limiter ring 80a which is axially spaced apart from valve seat second end 50b to provide the allowable amount of displacement of valve member 78. Travel limiter 80 also includes a plurality of travel limiter legs 80b which provide the axial spacing between travel limiter ring 80a and valve seat second end 50b. Travel limiter legs 80b are integrally formed with travel limiter ring 80a and are fixed to valve seat second end 50b, for example by welding.

Solenoid assembly 54 includes an inner housing 82, a pole piece 84 located within inner housing 82, an armature 85 located within inner housing 82, a return spring 86 which biases armature 83 away from pole piece 84, a control rod 87, a spool 88, a coil 90, an overmold 92, and an outer housing 94. The various elements of solenoid assembly 54 will be described in greater detail in the paragraphs that follow.

Inner housing 82 is hollow and is centered about, and extends along, inlet valve bore axis 56. The outer periphery of inner housing 82 engages the inner periphery of a solenoid bore 95 of fuel pump housing 28 where solenoid bore 95 is centered about, and extends along inlet valve bore axis 56. Inner housing 82 is welded to fuel pump housing 28, thereby fixing solenoid assembly 54 to fuel pump housing 28.

Pole piece 84 is made of a magnetically permeable material and is received within inner housing 82 in fixed relationship to inner housing 82, for example by interference fit or welding, such that pole piece 84 is centered about, and extends along, inlet valve bore axis 56. A pole piece first end 84a of pole piece 84 includes a pole piece spring pocket 84b extending thereinto from pole piece first end 84a to a pole piece spring pocket bottom surface 84c such that pole piece spring pocket 84b may be cylindrical and centered about inlet valve bore axis 56 and such that a portion of return spring 86 is located within pole piece spring pocket 84b in abutment with pole piece spring pocket bottom surface 84c.

Armature 85 is made of a material which is attracted by a magnet and is received within inner housing 82 in a slidable relationship to inner housing 82 along inlet valve bore axis 56 such that armature 85 is centered about, and extends along, inlet valve bore axis 56. Armature 85 may be of two-piece construction as shown which includes an armature first portion 85a which is proximal to pole piece 84 and an armature second portion 85b which is fixed to armature first portion 85a, for example, by welding or mechanical fasteners and which is distal from pole piece 84. Armature first portion 85a includes an armature spring bore 85c extending thereinto from an armature first end 85d which is proximal to pole piece 84 and which is centered about, and extends along, inlet valve bore axis 56. A portion of return spring 86 is located within armature spring bore 85c and abuts against armature second portion 85b such that return spring 86 is held in compression between armature second portion 85b and pole piece spring pocket bottom surface 84c, thereby biasing armature 85 in a direction away from pole piece 84. Armature second portion 85b includes an armature control rod bore 85e extending axially therethrough such that armature control rod bore 85e is centered about, and extends along, inlet valve bore axis 56.

Control rod 87 extends from a control rod first end 87a which is proximal to armature 85 to a control rod second end 87b which is proximal to valve member 78 such that control rod 87 is centered about, and extends along, inlet valve bore axis 56. Control rod 87 includes a control rod first shoulder 87c which is annular in shape and faces toward armature 85, and as shown, is transverse to inlet valve bore axis 56. A control rod first surface 87d extends from control rod first end 87a to control rod first shoulder 87c such that control rod first surface 87d is located at least partially within armature control rod bore 85e in a close sliding interface which allows control rod first surface 87d to freely move axially, i.e. along inlet valve bore axis 56, within armature control rod bore 85e while preventing radial movement, i.e. transverse to inlet valve bore axis 56, of control rod first surface 87d within armature control rod bore 85e. It is important to note that the close sliding interface between control rod first surface 87d and armature control rod bore 85e allows control rod 87 to move along inlet valve bore axis 56 independently of armature 85. Control rod first shoulder 87c limits the extent to which control rod first surface 87d is inserted into armature control rod bore 85e and control rod first shoulder 87c also provides a surface for armature 85 to react against in order to move control rod 87 toward valve member 78 as will be described in greater detail later. Control rod 87 includes a control rod second shoulder 87e which is annular in shape and faces toward valve seat 50, and as shown, is transverse to inlet valve bore axis 56. A control rod second surface 87f extends from control rod second end 87b to control rod second shoulder 87e such that control rod second surface 87f is located at least partially within valve seat central passage 66 in a close sliding interface which allows control rod second surface 87f to freely move axially, i.e. along inlet valve bore axis 56, within valve seat central passage 66 while preventing radial movement, i.e. transverse to inlet valve bore axis 56, of control rod second surface 87f within valve seat central passage 66. In use, control rod second end 87b is used to interface with check valve 52, and more particularly valve member 78, as will be described in greater detail later.

As illustrated herein, control rod 87 may be of multi-piece construction which includes a control rod central portion 87g, a control rod first bushing 87h which is tubular and fixed to control rod central portion 87g, and a control rod second bushing 87i which is tubular and fixed to control rod central portion 87g. Control rod central portion 87g is preferably cylindrical and is centered about inlet valve bore axis 56 such that control rod central portion 87g extends from control rod first end 87a to control rod second end 87b. By way of non-limiting example only, control rod central portion 87g may be a roller bearing which is commercially available. Control rod first bushing 87h is preferably cylindrical on its outer periphery which is centered about, and extends along inlet valve bore axis 56 such that control rod first shoulder 87c is defined by one axial end of control rod first bushing 87h. Control rod first bushing 87h includes a control rod first bushing bore 87j extending axially therethrough such that control rod first bushing bore 87j is preferably cylindrical. In order to prevent relative movement between control rod first bushing 87h and control rod central portion 87g, control rod first bushing 87h is fixed to control rod central portion 87g, for example, by one or more of interference fit between control rod first bushing bore 87j and control rod central portion 87g and welding. Similarly, control rod second bushing 87i is preferably cylindrical on its outer periphery which is centered about, and extends along, inlet valve bore axis 56 such that control rod second shoulder 87e is defined by one axial end of control rod second bushing 87i. Control rod second bushing 87i includes a control rod second bushing bore 87k extending axially therethrough such that control rod second bushing bore 87k is preferably cylindrical. In order to prevent relative movement between control rod second bushing 87i and control rod central portion 87g, control rod second bushing 87i is fixed to control rod central portion 87g, for example, by one or more of interference fit between control rod second bushing bore 87k and control rod central portion 87g and welding. By making control rod 87 a multi-piece component, control rod central portion 87g may be provided as a roller bearing which is commercially available in high volumes at low cost with surface finishes and tolerances which are important to the close sliding fit needed between control rod 87 and valve seat central passage 66 and between control rod 87 and armature control rod bore 85e. In an alternative arrangement, control rod first bushing 87h and control rod second bushing 87i may be combined to be a single bushing which minimizes the number of components, but has the drawback of increasing mass. In a further alternative, control rod 87 may be formed as a single piece of material in a turning operation.

While control rod 87 has been illustrated herein as being decoupled from armature 85, i.e. control rod 87 is able to move independently of armature 85, it should be understood that control rod 87 may be rigidly fixed to armature 85 such that control rod 87 always moves together with armature 85.

Spool 88 is made of an electrically insulative material, for example plastic, and is centered about, and extends along, inlet valve bore axis 56 such that spool 88 circumferentially surrounds inner housing 82 in a close-fitting relationship. Coil 90 is a winding of electrically conductive wire which is wound about the outer periphery of spool 88 such that coil 90 circumferentially surrounds a portion of pole piece 84. Consequently, when coil 90 is energized with an electric current, armature 85 is magnetically attracted to, and moved toward, pole piece 84, and when coil 90 is not energized with an electric current, armature 85 is moved away from pole piece 84 by return spring 86. A more detailed description of operation will be provided later.

Outer housing 94 circumferentially surrounds inner housing 82, spool 88, and coil 90 such that spool 88 and coil 90 are located radially between inner housing 82 and outer housing 94. Overmold 92 is an electrically insulative material, for example plastic, which fills the void between spool 88/coil 90 and outer housing 94 such that overmold 92 extends axially from outer housing 94 to define an electrical connector 96 which includes terminals (not shown) that are connected to opposite ends of coil 90. Electrical connector 96 is configured to mate with a complementary electrical connector (not show) for supplying electric current to coil 90 in use. As shown, a coil washer 98 may be provided within outer housing 94 axially between coil 90 and overmold 92 in order to complete the magnetic circuit of solenoid assembly 54.

Figure 4:
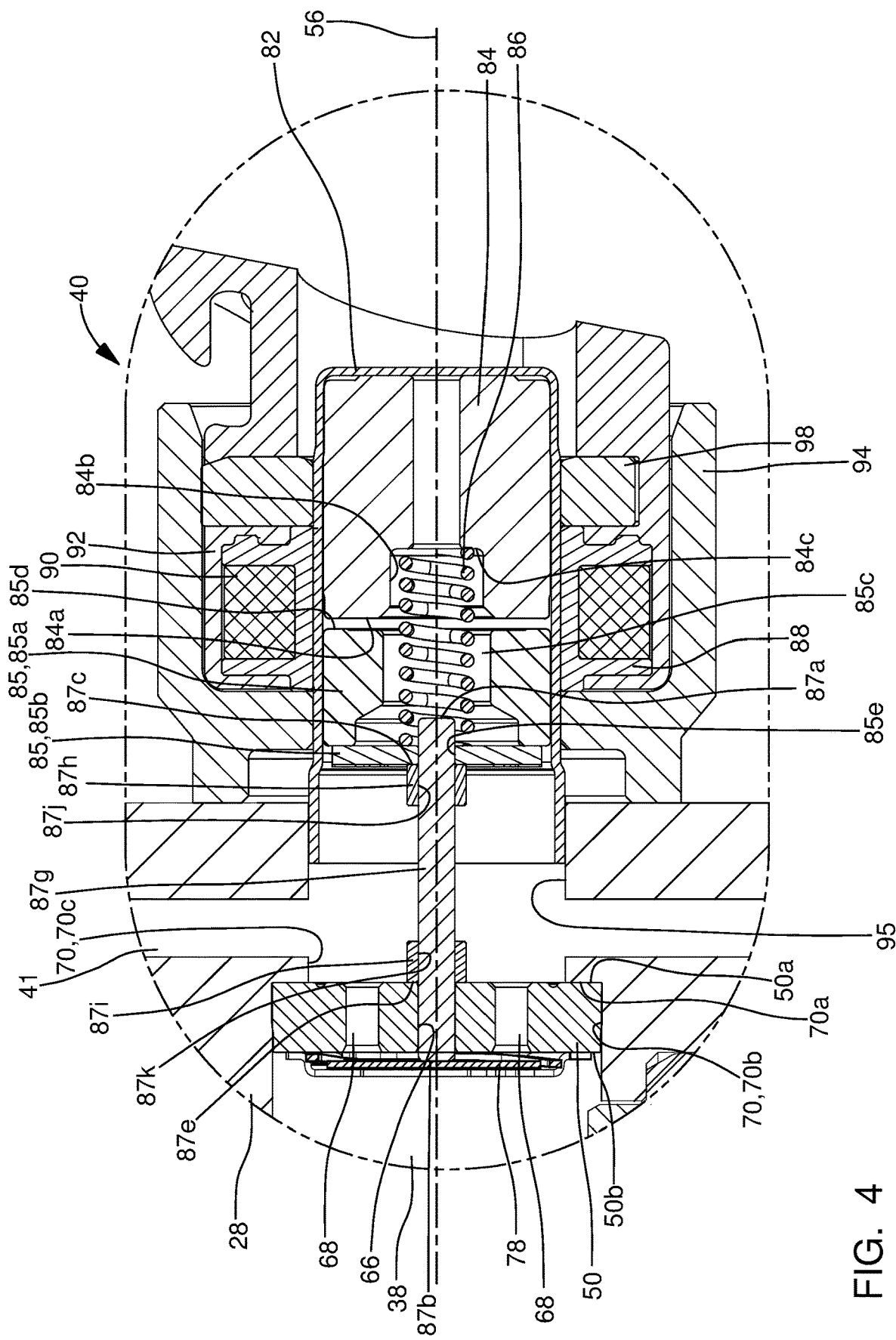
FIG. 4 is an enlargement of a portion of FIG. 2 showing the inlet valve assembly of the fuel pump in a first position.

Operation of high-pressure fuel pump 20, and in particular, inlet valve assembly 40, will now be described with particular reference to FIG. 4 which shows armature 85 in a first position which results from no electric current being supplied to coil 90 of solenoid assembly 54. When no electric current is supplied to coil 90, return spring 86 urges armature 85 away from pole piece 84. As armature 85 is urged away from pole piece 84, armature second portion 85b comes into contact with control rod first shoulder 87c and control rod 87 is urged toward valve member 78 until control rod second shoulder 87e abuts valve seat first end 54a which allows control rod second end 87b to protrude beyond valve seat second end 50b such that control rod second end 87b moves valve member 78 to, and holds valve member 78 in, an unseated position which permits flow through valve seat flow passages 68 and such that valve seat flow passages 68 are in fluid communication with pumping chamber 38. However, it is important to note that armature 85 may not remain in contact with control rod first shoulder 87c for the entire duration of travel, thereby allowing control rod second shoulder 87e to abut valve seat first end 50a before armature 85 again comes into contact with control rod first shoulder 87c. Consequently, two smaller, individual impacts may result which helps to minimize noise. To illustrate this phenomenon, FIG. 6 shows a transient position where control rod second shoulder 87e has impacted valve seat first end 50a, however, armature 85 has not yet regained contact with control rod first shoulder 87c. Without being bound by theory, this may result from armature 85 impacting control rod first shoulder 87c and propelling control rod 87 ahead of armature 85. Holding open valve member 78 open may be utilized to allow fuel to spill back toward pump housing inlet passage 41 during a portion of the compression stroke of pumping plunger 34 based on the mass of fuel that is needed to be delivered to fuel injectors 16, i.e. different operating conditions of internal combustion engine 12 require different fuel masses to be delivered to fuel injectors 16 for each pumping cycle of pumping plunger 34 and the mass of fuel delivered to fuel injectors 16 can be adjusted by allowing a portion of the fuel involved in a compression stroke to be spilled back to pump housing inlet passage 41. An electronic control unit 100 may be used to time the supply of electric current to coil 90 during the compression stroke, thereby varying the proportion of fuel from the compression stroke that is supplied to fuel injectors 16 and the proportion of fuel from the compression stroke that is spilled back to pump housing inlet passage 41. Electronic control unit 100 may receive input from a pressure sensor 102 which senses the pressure within fuel rail 44 in order to provide proper timing of the supply electric current to coil 90 in order to maintain a desired pressure in fuel rail 44 which may vary based on the commanded torque desired to be produced by internal combustion engine 12.

Now with particular reference to FIG. 5, armature 85 is shown in a second position which results from electric current being supplied to coil 90 of solenoid assembly 54. When electric current is supplied to coil 90, armature 85 is attracted to, and moves toward, pole piece 84 until armature first end 85d abuts pole piece first end 84a. When electric current is supplied to coil 90 during the compression stroke of pumping plunger 34, fuel pressure within pumping chamber 38 acts on valve member 78, and since armature 85 is no longer acting upon control rod 87, valve member 78 urges control rod 87 toward armature 85 until valve member 78 blocks valve seat flow passages 68. It should be noted that since control rod 87 and armature 85 are allowed to move independently of each other along inlet valve bore axis 56, armature 85 separates from control rod first shoulder 87c. As a result, an impact resulting only from the mass of armature 85 coming into abutment with pole piece 84 occurs. Furthermore, since this impact does not include the mass of control rod 87, a smaller sound intensity is produced compared to prior art inlet control valves. It should also be noted that the position of armature 85 illustrated in FIG. 5 does not require valve member 78 to be in the seated position, but rather, the state of valve member 78 is determined by the differential pressure across valve member 78. In this way, valve member 78 is opened during the intake stroke to allow fuel to flow into pumping chamber 38.

In an alternative which is not shown, inlet valve assembly 40 may alternatively be arranged to be coaxial with plunger bore 30, thereby placing the shoulder which supports valve seat 50 above (as oriented in the figures) pumping plunger 34. Such an arrangement would allow insertion of valve seat 50 through the bore of fuel pump housing 28 which receives the insert within which pumping plunger 34 reciprocates where it is noted that valve seat 50 would positioned prior to the insert being placed within the housing.

High-pressure fuel pump 20 with valve seat 50 supported by shoulder 70a of fuel pump housing 28 as described herein allows the high cyclic load generated by the pressurization of fuel within pumping chamber 38 to be carried directly by fuel pump housing 28 rather than by secondary means such as interference fit, threaded connections, welding, and threaded fasteners as is currently used in the prior art. In this way, the number of components and processes is reduced, thereby reducing cost and providing a more robust connection.

While this invention has been described in terms of preferred embodiments thereof, it is not intended to be so limited, but rather only to the extent set forth in the claims that follow.

I claim:

1. A fuel pump comprising:
   a fuel pump housing with a pumping chamber defined therein, said fuel pump housing having an inlet valve bore which is connectable to a source of fuel via a pump housing inlet passage, said inlet valve bore extending along an inlet valve bore axis and being stepped such that said inlet valve bore includes a shoulder which is transverse to said inlet valve bore axis and which is part of the fuel pump housing;
   a pumping plunger which reciprocates within a plunger bore along a plunger bore axis such that an intake stroke of said pumping plunger increases volume of said pumping chamber and a compression stroke of said pumping plunger decreases volume of said pumping chamber; and
   an inlet valve assembly comprising:
      a valve seat with a valve seat flow passage extending therethrough, said valve seat being located within said inlet valve bore such that said valve seat abuts said shoulder and is urged toward said shoulder by pressure within said pumping chamber during said compression stroke;
      a valve member which is moveable between 1) an unseated position which provides fluid communication through said valve seat flow passage and 2) a seated position which prevents fluid communication through said valve seat flow passage.

2. A fuel pump as in claim 1, wherein said shoulder faces toward said pumping chamber.

3. A fuel pump as in claim 1, wherein:
   said inlet valve bore includes an inlet valve bore first portion which is proximal to said pumping chamber and which has a first diameter;
   said inlet valve bore includes an inlet valve bore second portion which is distal from said pumping chamber and which has a second diameter that is less than said first diameter.

4. A fuel pump as in claim 3, wherein said shoulder joins said inlet valve bore first portion and said inlet valve bore second portion.

5. A fuel pump as in claim 3, wherein said fuel pump housing includes a second bore extending therethrough from said pumping chamber such that said second bore is sized to allow passage of said valve seat therethrough to accommodate installation of said valve seat into said inlet valve bore first portion through said second bore.

6. A fuel pump as in claim 5, wherein said second bore is diametrically opposed to said inlet valve bore.

7. A fuel pump as in claim 5, wherein:
said inlet valve bore is centered about said inlet valve bore axis; and
said second bore is centered about said inlet valve bore axis.

8. A fuel pump as in claim 5, wherein said fuel pump further comprises an outlet valve assembly which is located within said second bore, said outlet valve assembly allowing pressurized fuel to flow out of said pumping chamber and preventing fuel from flowing back into said pumping chamber.

9. A fuel pump as in claim 8, wherein:
said inlet valve bore is centered about said inlet valve bore axis; and
said second bore is centered about said inlet valve bore axis.

10. A fuel pump as in claim 3, wherein said valve seat is fixed within said inlet valve bore first portion by interference fit such that an outer periphery of said valve seat is sealed to an inner periphery of said inlet valve bore first portion.

11. A fuel pump as in claim 3, wherein said shoulder faces toward said pumping chamber.

* * * * *